June 9, 1936. P. W. BAKER 2,043,790
THRUST WASHER ASSEMBLY.
Filed Jan. 8, 1932
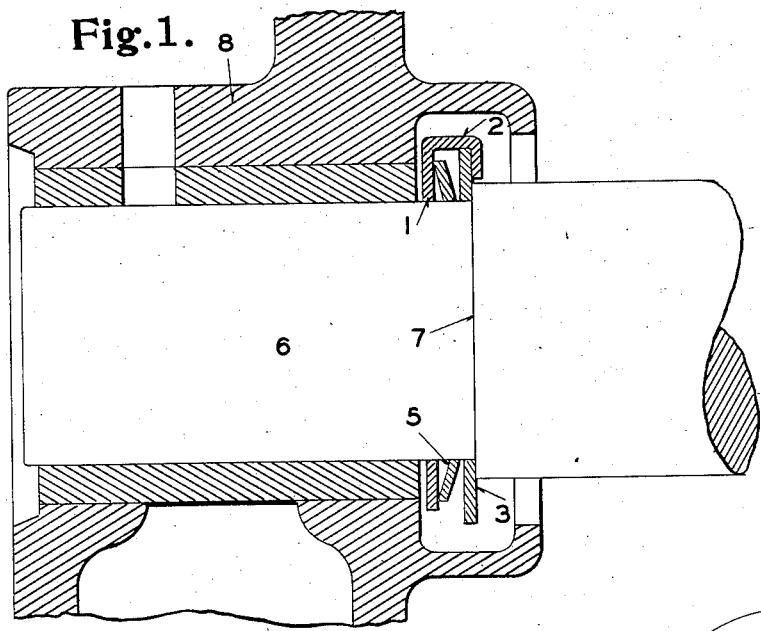
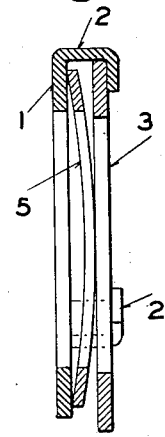
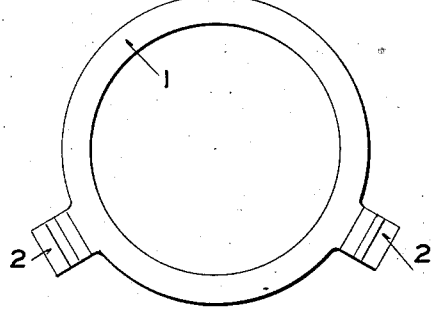
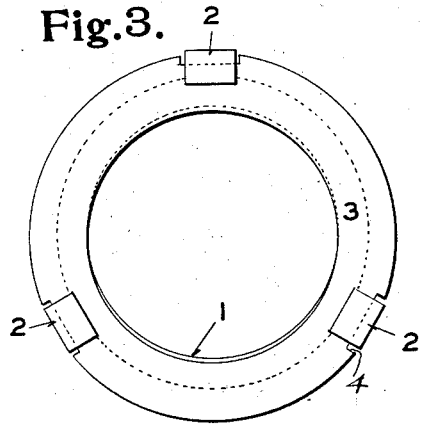
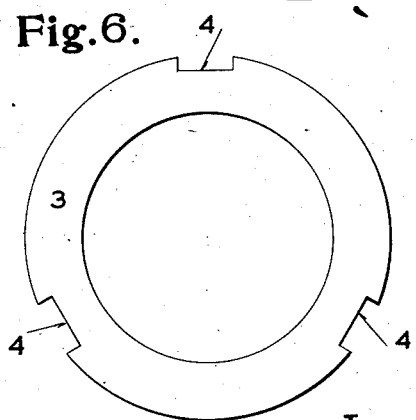
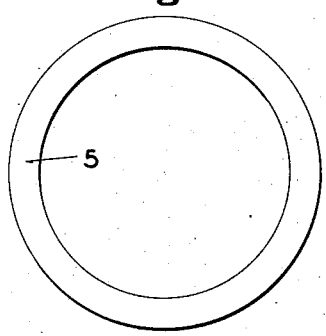
Inventor
PAUL W. BAKER
By E. E. Huffman
Att'y.

Patented June 9, 1936

2,043,790

UNITED STATES PATENT OFFICE 2,043,790

THRUST WASHER ASSEMBLY

Paul W. Baker, St. Louis, Mo., assignor to Wagner Electric Corporation, St. Louis, Mo., a corporation of Delaware Application January 8, 1932, Serial No. 585,490

4 Claims. (Cl. 308—163)

My invention relates to thrust washers and more particularly to an improvement in the dished washer type used on small shafts, such as those of electric motors, to cushion end play and thus eliminate the noises resulting therefrom.

In the plain dished type of washer it has been found that the washer, which is interposed between a shoulder on the shaft and the shaft bearing support, not only wears rapidly but also wears the shaft shoulder and the support due to the relative movement between the shaft, washer, and support, thereby increasing the shaft end play. It is, therefore, the principal object of my invention to produce a thrust washer assembly that will eliminate the above noted undesirable features of the plain dished thrust washer and which will be economical to manufacture and easy to assemble.

Other objects of my invention will become apparent from the following description taken in connection with the accompanying drawing, showing a preferred embodiment thereof. Figure 1 of the drawing is a partial cross sectional view showing my improved thrust washer assembly mounted on one end of a shaft; Figure 2 is a cross sectional view of the assembly; Figure 3 is a side view of the assembly shown in Figure 2; and Figures 4, 5 and 6 are views of the different parts prior to assembly.

Referring to the drawing in detail, I indicates an annular retaining member provided with ears 2 bent approximately at right angles to the surface of the member. A second annular retaining member 3 is provided with notches 4 for receiving the ears 2. The two annular members I and 3 form a casing or holder for the annular dished spring washer 5 which is interposed between the annular members and is normally maintained in contact therewith by the outer end of the ears 2 being bent over the outer surface of the annular member 3. By this construction the retaining members are prevented from relative rotary movement yet at the same time they may be moved toward each other to compress the washer.

The shaft 6, upon which the thrust washer assembly is to be placed, is provided with a shoulder 7 adjacent the support 8 in which the shaft end is journaled. The openings in the annular retaining members and the annular washer are all made of the same diameter and very slightly larger than the external diameter of the shaft. When the parts are assembled, the ears 2 are so bent that the openings of at least two of the parts will be biased slightly out of alignment, thereby so decreasing the effective size of the opening in the assembly as a whole, that when forced into substantial alignment, when the assembly is placed on the shaft, it will have a sufficiently tight fit therewith to cause it to rotate with the shaft. The retainer member 3 is placed next to the shoulder 7 which is sufficiently small to fit within the bent over ears 2 so that the thrust of the shaft will be taken by the spring washer 5. The retainer member I is slightly spaced from the bearing support 8, as shown, and along with the slight space allowed between the same member and the support on the other end of the shaft (not shown), gives the shaft a small amount of end play. The purpose of this slight end play is to decrease the friction between the member I and the support, since the member I rotates with the shaft.

It will be readily seen that with my improved thrust washer assembly there is no relative rotary movement between any of the parts of the assembly and the shaft, thereby eliminating all wear on the shoulder 7 and, consequently, allowing the use of a much smaller shoulder. The only parts receiving any wear are the support 8 and the adjacent face of the retainer member I, they, however, being normally slightly spaced apart to decrease the friction therebetween to a minimum.

It is also to be noted that with the member I and the support 8 presenting cooperating flat surfaces, the wear thereon will be less than if the sharp washer edge were in contact with the support. All of the parts of the assembly can be produced by punch presses and can, therefore, be easily and cheaply manufactured.

Having fully described my invention, what I claim as new and desire to secure by Letters Patent of the United States is:

1. A thrust washer assembly comprising an annular member provided with spaced apart ears on its periphery, a second annular member provided with spaced apart notches on its periphery for cooperating with the ears to prevent relative rotation of the members, said ears also limiting the extent of separation of the members, and a spring washer interposed between the members and normally maintaining them in maximum spaced relation.

2. The combination with a shaft support, of a thrust washer assembly therefor comprising an annular spring member, an annular member on each side of the spring member, and means for holding the annular members in contact with the spring member, the diameters of the openings of two of said members being slightly greater than the diameter of the portion of the shaft received thereby and being biased out of alignment to a sufficient extent to grip the shaft and cause the assembly to rotate therewith.

3. A thrust washer assembly for absorbing the entire end thrust of a rotary shaft which is mounted in a sleeve bearing and provided with a thrust shoulder for cooperation with a stationary thrust shoulder, said assembly comprising two ring members surrounding the shaft, one of which cooperates with the shaft thrust shoulder and the other with the stationary thrust shoulder, a curved spring thrust washer surrounding the shaft and interposed between the ring members and having sufficient resiliency to oppose and absorb the end thrust of the shaft, and means comprising integral interengaging parts adjacent the periphery of the assembly for preventing rotation of the ring members relative to each other but permitting them to move axially toward each other, one of said interengaging parts being provided with a flange acting as a stop for the other part to thereby limit the extent of axial separation of the rings.

4. A thrust washer assembly for use between a thrust shoulder on a rotating shaft and an adjacent stationary thrust shoulder, said assembly comprising two annular members surrounding the shaft and an axially yieldable annular spring member surrounding the shaft and interposed between said ring members, means preventing rotation of the ring members relatively to each other but permitting them to move axially relatively to each other, the diameters of the openings of at least two of said members being slightly greater than the diameter of the portion of the shaft received thereby and being biased out of alignment by means on the assembly and to a sufficient extent to grip the shaft and cause the assembly to rotate therewith.

PAUL W. BAKER.